United States Patent
Luo et al.

(10) Patent No.: US 11,281,651 B2
(45) Date of Patent: Mar. 22, 2022

(54) METHOD AND SYSTEM FOR INGESTING DATA IN A DATABASE

(71) Applicant: ALIBABA GROUP HOLDING LIMITED, Grand Cayman (KY)

(72) Inventors: Congnan Luo, San Mateo, CA (US);
Cheng Zhu, San Mateo, CA (US);
Xiaowei Zhu, San Mateo, CA (US);
Fang Zheng, San Mateo, CA (US);
Huaizhi Li, San Mateo, CA (US);
Ruiping Li, San Mateo, CA (US)

(73) Assignee: Alibaba Group Holding Limited, Grand Cayman (KY)

( * ) Notice: Subject to any disclaimer, the term of this patent is extended or adjusted under 35 U.S.C. 154(b) by 71 days.

(21) Appl. No.: 16/727,627

(22) Filed: Dec. 26, 2019

(65) Prior Publication Data
US 2021/0200736 A1 Jul. 1, 2021

(51) Int. Cl.
| | |
|---|---|
| *G06F 16/22* | (2019.01) |
| *G06F 16/242* | (2019.01) |
| *G06F 11/14* | (2006.01) |
| *G06F 16/23* | (2019.01) |
| *G06F 16/2453* | (2019.01) |

(52) U.S. Cl.
CPC ...... *G06F 16/2282* (2019.01); *G06F 11/1402* (2013.01); *G06F 16/2358* (2019.01); *G06F 16/244* (2019.01); *G06F 16/24549* (2019.01)

(58) Field of Classification Search
CPC ....... G06F 16/00; G06F 16/21; G06F 16/2453
USPC ........................................................ 707/737
See application file for complete search history.

(56) References Cited

U.S. PATENT DOCUMENTS

| | | | | |
|---|---|---|---|---|
| 8,856,193 | B2 * | 10/2014 | Mueller | G06F 16/21 707/809 |
| 2013/0159248 | A1 * | 6/2013 | Mueller | G06F 16/21 707/609 |
| 2015/0026122 | A1 * | 1/2015 | Mueller | G06F 16/00 707/609 |

(Continued)

OTHER PUBLICATIONS

Greenplum downloaded from https://en.wikipedia.org/wiki/Greenplum, 4 pages (2019).

(Continued)

*Primary Examiner* — Hung T Vy
(74) *Attorney, Agent, or Firm* — Finnegan, Henderson, Farabow, Garrett & Dunner, LLP

(57) ABSTRACT

Embodiments of the present disclosure provide methods and devices for inserting data in a database. The method can include caching one or more rows of data in a delta table in response to a request to insert the one or more rows in a destination table, wherein the destination table is one of a group of destination tables of a first database, and wherein the delta table contains requested changes of rows of the destination table, the changes being caused by a data operation; determining a priority of the destination table based on runtime information of the destination table relative to the group of destination tables; and scheduling the merging of the inserted rows from the delta table to the destination table based on the determined priority of the destination table. The destination table is in a format of a file storing one or more blocks, each block having a set of sequence of elements clustered from each column of the destination table.

20 Claims, 9 Drawing Sheets

(56) References Cited

U.S. PATENT DOCUMENTS

2018/0336229 A1* 11/2018 Muehle ............... G06F 16/2282

OTHER PUBLICATIONS

Greenplum downloaded from https://github.com/greenplum-db/gpdb, 8 pages (2019).

Vertica, "The Vertica Analytic Database Technical Overview White Paper, A DBMS Architecture Optimized for Next-Generation Data Warehousing," https://pdfs.semanticscholar.org/0cb4/d21ca5198819a85adae8ea18fae83a0e9939.pdf, 13 pages (Mar. 2010).

Cstore_fdw downloaded from https://github.com/citusdata/cstore_fdw, 7 pages (2019).

MariaDB ColumnStore, downloaded from https://pdfs.semanticscholar.org/0cb4/d21ca5198819a85adae8ea18fae83a0e9939.pdf, 2 pages, (2019).

M|18 Understanding the Architecture of MariaDB ColumnStore downloaded from https://www.slideshare.net/MariaDB/m18-understanding-the-architecture-of-mariadb-columnstore, 38 pages of slides (Published Mar. 6, 2018).

ColumnStore Data Ingestion downloaded from https://mariadb.com/kb/en/columnstore-data-ingestion/, 2 pages (2019).

Monetdb The column-store pioneer downloaded from https://www.monetdb.org/Home, 2 pages (2018).

Abadi et al., "The Design and Implementation of Modern Column-Oriented Database Systems," Foundations and Trends in Databases, vol. 5 No. 3, pp. 197-280 (2012).

\* cited by examiner

| ID | LastName | FirstName | Salary |
|---|---|---|---|
| 100 | Smith | Joe | 20000 |
| 101 | Jones | Cathy | 50000 |
| 102 | Johnson | Mary | 90000 |
| 103 | Hank | Tom | 33000 |
| 104 | Levis | Jerry | 44000 |
| 105 | Rivers | Andy | 66000 |

(A)

| ID | LastName | FirstName | Salary |
|---|---|---|---|
| 100 | Smith | Joe | 20000 |
| 101 | Jones | Cathy | 50000 |
| 102 | Johnson | Mary | 90000 |
| 103 | Hank | Tom | 33000 |
| 104 | Levis | Jerry | 44000 |
| 105 | Rivers | Andy | 66000 |

METHOD AND SYSTEM FOR INGESTING DATA IN A DATABASE

BACKGROUND

In a relational database, data is represented as a two-dimensional table of rows and columns. In current solutions, the data can be stored in row-oriented and column-oriented formats.

A row-oriented Database Management System (DBMS) stores data tables by row. Row-oriented systems are designed to efficiently return data for an entire row, or record, in as few operations as possible. This matches the common use-case where the system is attempting to retrieve information about a particular object or product information for an online shopping system. By storing the record's data in a single block on the disk, along with related records, the system can quickly retrieve records with a minimum of disk I/O operations. However, in Online Analytical Processing (OLAP) queries, not each value of a row is of same significance. Row-oriented systems are not efficient at performing queries when only a few columns of a row are desired for queries.

A columnar or column-oriented DBMS stores data tables by column. The values of one column in a table are stored in one column file. This is designed to efficiently support OLAP queries where often only a few columns instead of an entire row are of interest in a table. In a columnar format, data of a particular column or a few columns can be retrieved without performing I/O operations on the columns that are not queried. In addition, compression on the values of one column can be more effective as they are of the same type, which has been proven to be a considerable saving on I/O cost for many typical OLAP queries. By storing data in columns rather than rows, the database can more precisely access the data it needs to answer a query rather than scanning and discarding unwanted data in rows. Query performance is increased for certain workloads. However, as values of all the columns of a single row spread across different column files, accessing a row requires accessing all corresponding column files. Since many typical Online Transactional Processing (OLTP) queries often request such operations, I/O costs are inevitably increased in columnar systems.

For example, a query to insert a row requires accessing data from an entire row. It is more efficient to perform such query in a row-oriented database as the data is located in a single location and disk seeks are minimized. In a column-oriented database, each file that stores a column is accessed to access a row. In a database with 10000 columns, the transaction involves accessing 10000 files. Thus, column-oriented database systems are limited by system consumption cost that is required to handle transactions such as an insert.

Both columnar and row databases can use traditional database query languages like SQL to load data and perform queries and can become the backbone in a system to serve data for common extract, transform, load and data visualization tools. In current solutions, a relational database can be stored in a row-oriented format in one copy and in a column-oriented format in another copy such that a system can benefit from both formats, however, at the cost of consumption of resources.

SUMMARY

Embodiments of the present disclosure provide methods and systems for inserting data in a database. The method can include caching one or more rows of data in a delta table in response to a request to insert the one or more rows in a destination table, wherein the destination table is one of a group of destination tables of a first database, and wherein the delta table contains requested changes of rows of the destination table, the changes being caused by a data operation; determining a priority of the destination table based on runtime information of the destination table relative to the group of destination tables; and scheduling the merging of the inserted rows from the delta table to the destination table based on the determined priority of the destination table. The destination table is in a format of a file storing one or more blocks, each block having a set of sequence of elements clustered from each column of the destination table.

BRIEF DESCRIPTION OF THE DRAWINGS

The accompanying drawings described herein are used to provide further understanding of the present disclosure and constitute a part of the present disclosure. Exemplary embodiments of the present disclosure and descriptions of the exemplary embodiments are used to explain the present disclosure and are not intended to constitute inappropriate limitations to the present disclosure. In the accompanying drawings:

FIG. 1 illustrates exemplary formats of storing data in a database.

DETAILED DESCRIPTION

Figure 2:
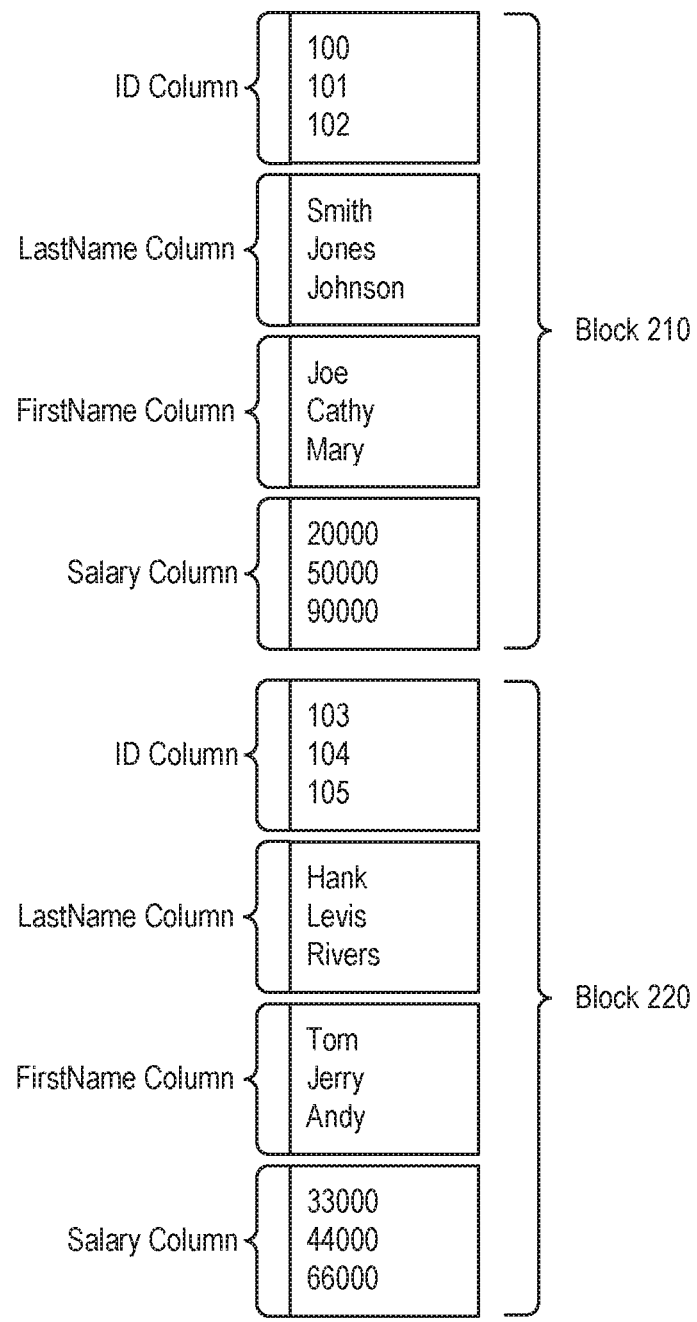
FIG. 2 illustrates an exemplary format of row-column hybrid storage in a database.

To facilitate understanding of the solutions in the present disclosure, the technical solutions in some of the embodiments of the present disclosure will be described with reference to the accompanying drawings. It is appreciated that the described embodiments are merely a part of rather than all the embodiments of the present disclosure. Consistent with the present disclosure, other embodiments can be obtained without departing from the principles disclosed herein. Such embodiments shall also fall within the protection scope of the present disclosure.

Column-oriented databases are less suited for OLTP workloads as accessing files containing all columns is required and system cost is inevitably high. In addition, transactions such as intensive and frequent inserts are common in current database systems. Some conventional column-oriented database systems can provide batch load commands and tools for users to load static data from a data source manually. For example, a conventional database system handles data insertion in batches and does not support real-time insertion. It is difficult for conventional column-oriented databases to achieve ACID, high insertion rate for continuous flow of data and real-time data visibility. ACID is a set of properties of database transactions to guarantee validity of data at any point of time. In databases, a transaction can consist of a sequence of operations that satisfies the ACID requirement. These operations are bounded together and can be perceived as a single logical operation on the data. Atomicity indicates that the operations perceived as one signal logical operation are non-done or all-done. Consistency demands that the data must meet all validation rules. The consistency can be checked after each transaction. A validity check that reveals inconsistency with the rules can lead to cancellation of the transaction and rollback of affected rows of a database. Transactions are often executed concurrently, e.g. multiple transactions reading and writing to a table at the same time. Isolation ensures that concurrent execution of transactions leaves the database in the same state that would have been obtained if the transactions were executed sequentially. Durability indicates all modifications of a committed transaction are not lost in cases of system disaster, like power down or crash. The support of ACID of both tables enables that transactions on data of the relational database is performed at a block level, even though the data is stored separately from the metadata.

The disclosed embodiments provide improvements over these conventional systems. For example, in some embodiments, a database system uses a row-column hybrid format to assist with performing real-time insert transactions. The database system provides data ingestion that includes an insert transaction and a merge transaction, both of which are ACID-compliant for handling massive, continuous, dynamically changing data ingestion on a column-oriented relational database engine. The newly inserted data can be visible to concurrent users immediately (e.g., within milliseconds).

Many of the modern databases are columnar databases, which store data in columns rather than in rows. FIG. 1 illustrates exemplary formats of storing data in a database. As illustrated in FIG. 1(A), data can be logically represented as a two-dimensional table, which comprises columns and rows. The table shown in FIG. 1(A) has four columns and six rows. The columns are named "ID," "LastName," "FirstName," and "Salary." Data shown in the table can be stored in a number of ways. One way is called row-oriented storage. In row-oriented storage, data is stored row by row, and all the columns of a single row are physically placed together, similar to those shown in FIG. 1(A). The row-oriented storage is used for efficient access of data located in the same row. For example, if a user of a database system wishes to retrieve all column information associated with an entry "100" in the "ID" column, the user can easily retrieve entries "Smith," "Joe," and "20000" from the storage since these entries are physically stored together. Row-oriented storage is commonly used for transactional queries, such as OLTP.

Another way to store data is called column-oriented storage. In column-oriented storage, data is stored column by column, and all the rows of a single column are physically placed together. As shown in FIG. 1(B), each column is saved in a separately. For example, all entries in the "ID" column are saved together. Each column is usually further divided into blocks and each block is stored in compressed form. During query processing, data is read back from storage into memory in units of blocks.

The column-oriented storage is used to efficiently support analytical queries that are often interested in a subset of one or more columns. With the column-oriented storage, data of a particular column or a few columns can be retrieved without wasting input/output ("I/O") bandwidth on columns that are not needed. In addition, column-oriented storage can allow for more efficient data compression because data in a column is typically of a same type. Column-orientated storage has demonstrated an ability to provide significant saving on I/O cost for many analytical queries, including OLAP.

In many database systems featuring the column-oriented storage, data of all columns of a single row are spread out across the storage disk or multiple storage disks. For example, a block of data can be stored in a specific location on a disk storage, and other blocks of data may be stored in other locations that are not physically adjacent. As a result, accessing a particular row will require accessing multiple disk blocks spread across the storage disk or multiple storage disks, which can cause significant delay. Unfortunately, many typical OLTP queries often request such operations.

To address this inefficiency, some database systems adopt a row-columnar storage or row-column hybrid storage. It first divides rows into blocks. The column-oriented storage is then used for each block. FIG. 2 illustrates an exemplary format of row-column hybrid storage in a database. On the basis of the data illustrated in FIG. 1, the row-column hybrid storage of FIG. 2 divides up the data into two blocks named block 210 and block 220. Block 210 comprises the first three rows of data, and block 220 comprises the next three rows of data. Data in each block is then stored according to the column-oriented storage.

Depending on the size of the blocks, accessing a particular row in a row-column hybrid storage can request fewer data blocks than the pure column-oriented storage, because the column entries of a row are now located closer to each other. As a result, the row-column hybrid storage can perform well for OLTP queries. At the same time, the row-column hybrid storage still gets a great deal of benefit of the column-oriented storage that is applied to each block, because data inside each block is still stored in a column-oriented storage. Therefore, the row-column hybrid storage is often a good option for a mixed workload of OLTP and OLAP. In the following description, column-oriented storage is used to describe pure column-oriented storage and its row-column variant, and row column storage and row-column hybrid storage are used interchangeably.

Figure 3:
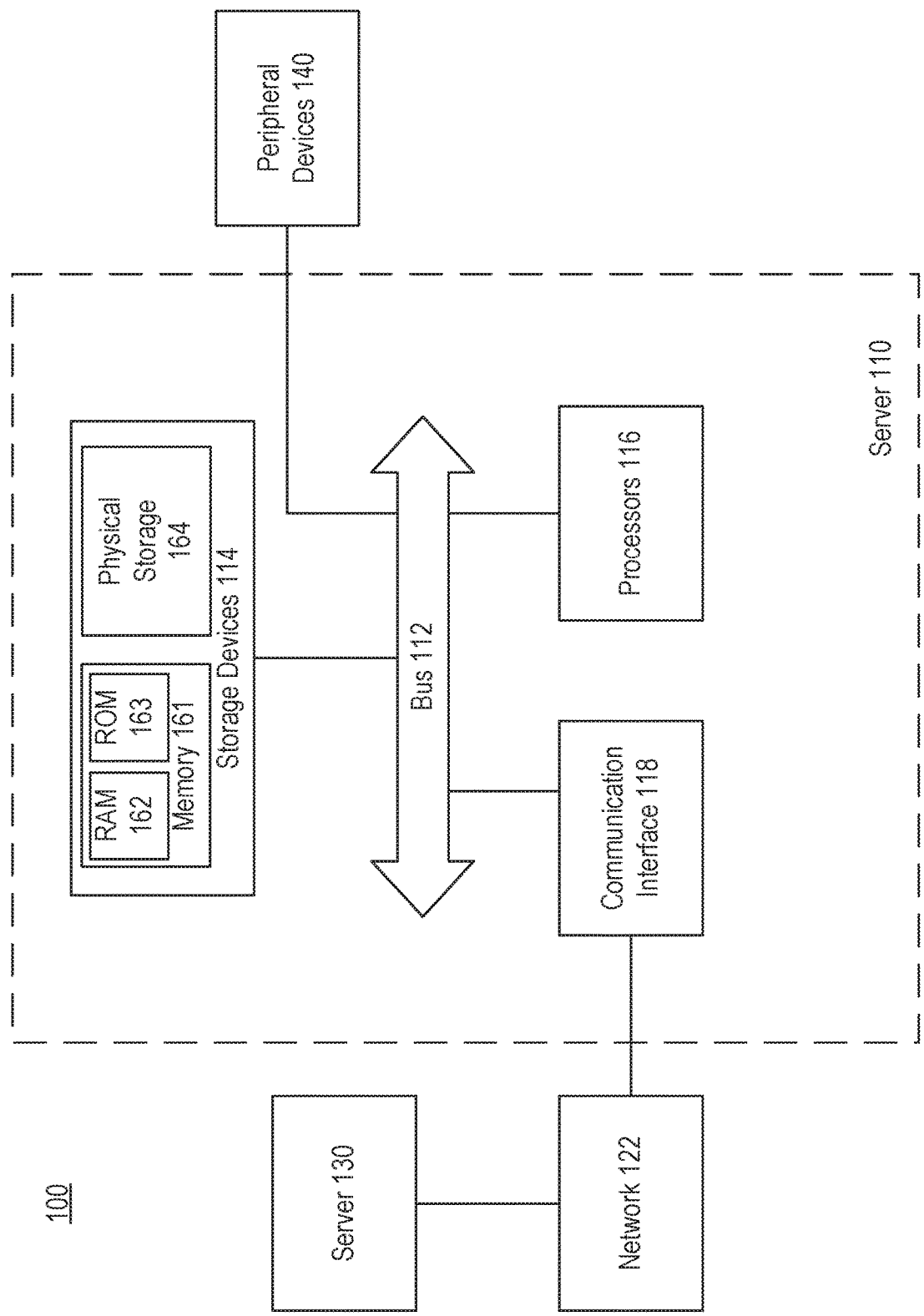
FIG. 3 illustrates a schematic diagram of an exemplary server of a database, consistent with some embodiments of the present disclosure.

FIG. 3 illustrates a schematic diagram of an exemplary server of a database, according to some embodiments of the present disclosure. According to FIG. 3, server 110 of database 100 comprises a bus 112 or other communication mechanism for communicating information, and one or more processors 116 communicatively coupled with bus 112 for processing information. Processors 116 can be, for example, one or more microprocessors. In some embodiments, database 100 can be an OLAP database, an OLTP database, or a hybrid transactional/analytical processing (HTAP) database.

Server 110 can transmit data to or communicate with another server 130 through a network 122. Network 122 can be a local network, an internet service provider, internet, or any combination thereof. Communication interface 118 of server 110 is connected to network 122. In addition, server 110 can be coupled via bus 112 to peripheral devices 140, which comprises displays (e.g., cathode ray tube (CRT), liquid crystal display (LCD), touch screen, etc.) and input devices (e.g., keyboard, mouse, soft keypad, etc.).

Server 110 can be implemented using customized hard-wired logic, one or more ASICs or FPGAs, firmware, or program logic that in combination with the server causes server 110 to be a special-purpose machine.

Server 110 further comprises storage devices 114, which may include memory 161 and physical storage 164 (e.g., hard drive, solid-state drive, etc.). Memory 161 may include random access memory (RAM) 162 and read only memory (ROM) 163. Storage devices 114 can be communicatively coupled with processors 116 via bus 112. Storage devices 114 may include a main memory, which can be used for storing temporary variables or other intermediate information during execution of instructions to be executed by processors 116. Such instructions, after being stored in non-transitory storage media accessible to processors 116, render server 110 into a special-purpose machine that is customized to perform operations specified in the instructions. The term "non-transitory media" as used herein refers to any non-transitory media storing data or instructions that cause a machine to operate in a specific fashion. Such non-transitory media can comprise non-volatile media or volatile media. Non-transitory media include, for example, optical or magnetic disks, dynamic memory, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, flash memory, register, cache, any other memory chip or cartridge, and networked versions of the same.

Various forms of media can be involved in carrying one or more sequences of one or more instructions to processors 116 for execution. For example, the instructions can initially be carried out on a magnetic disk or solid-state drive of a remote computer. The remote computer can load the instructions into its dynamic memory and send the instructions over a telephone line using a modem. A modem local to server 110 can receive the data on the telephone line and use an infra-red transmitter to convert the data to an infra-red signal. An infra-red detector can receive the data carried in the infra-red signal and appropriate circuitry can place the data on bus 112. Bus 112 carries the data to the main memory within storage devices 114, from which processors 116 retrieves and executes the instructions.

Figure 4:
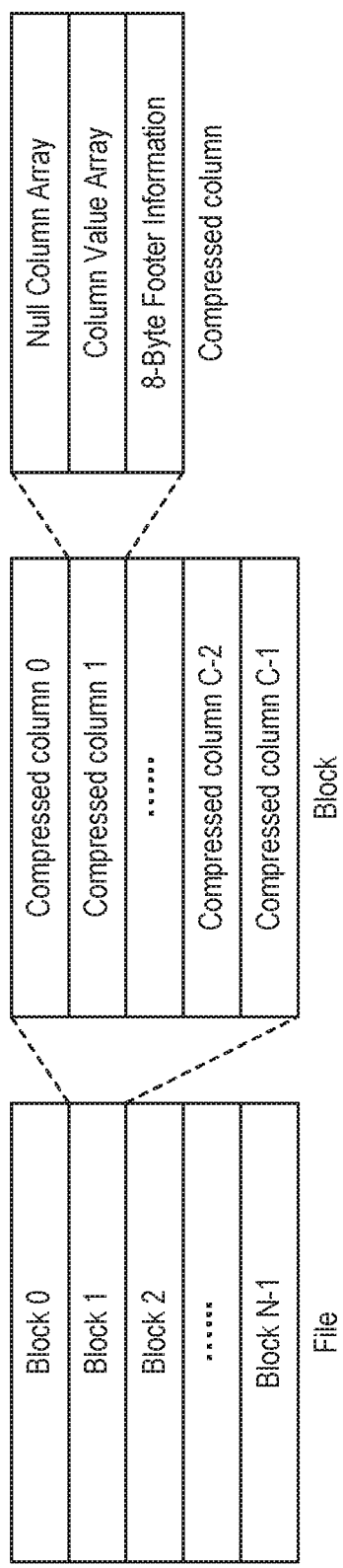
FIG. 4 illustrates a schematic diagram of an exemplary formatted table, consistent with some embodiments of the present disclosure.

In some embodiments, the database system employs a row-column hybrid database format. FIG. 4 illustrates a schematic diagram of an exemplary formatted table, consistent with some embodiments of the present disclosure. The relational database is formatted into a file where the data file stores multiple blocks. For example, data file comprises block 0, block 1, block 2, etc. Inside each block, columns are compressed one by one, and the compressed columns are stored in order. For example, block 1 comprises compressed column 0, compressed column 1, compressed column 2, etc., and the compressed columns are stored in their respective order. The metadata for the compressed columns in the data file is stored in a separate table. The blocks can be N-variable-length blocks. Each block can contain different number of rows of the relational database. Each block stores clustered columns in a columnar format. Each column is compressed within one block.

To prevent write-write contention on the same database among concurrent writers, the database can be partitioned into N segments. N is a configurable variable and could haves a default value of 256. In each segment, every column has a corresponding individual column file. Therefore, the concurrent writers can have exclusive write lock of different segments. The column values of new rows can be appended in the files associated with the segment. The write operations of the concurrent writers can be performed in parallel.

Each compressed column can include metadata such as Null Column Array that indicates which column value is null, and Footer Information that indicates column compression type and checksum, along with Column Value Array that contains values of the column. When the column is compressed, Null Column Array is used to assist clustering data of the same type for better compression rate.

Figure 6A:
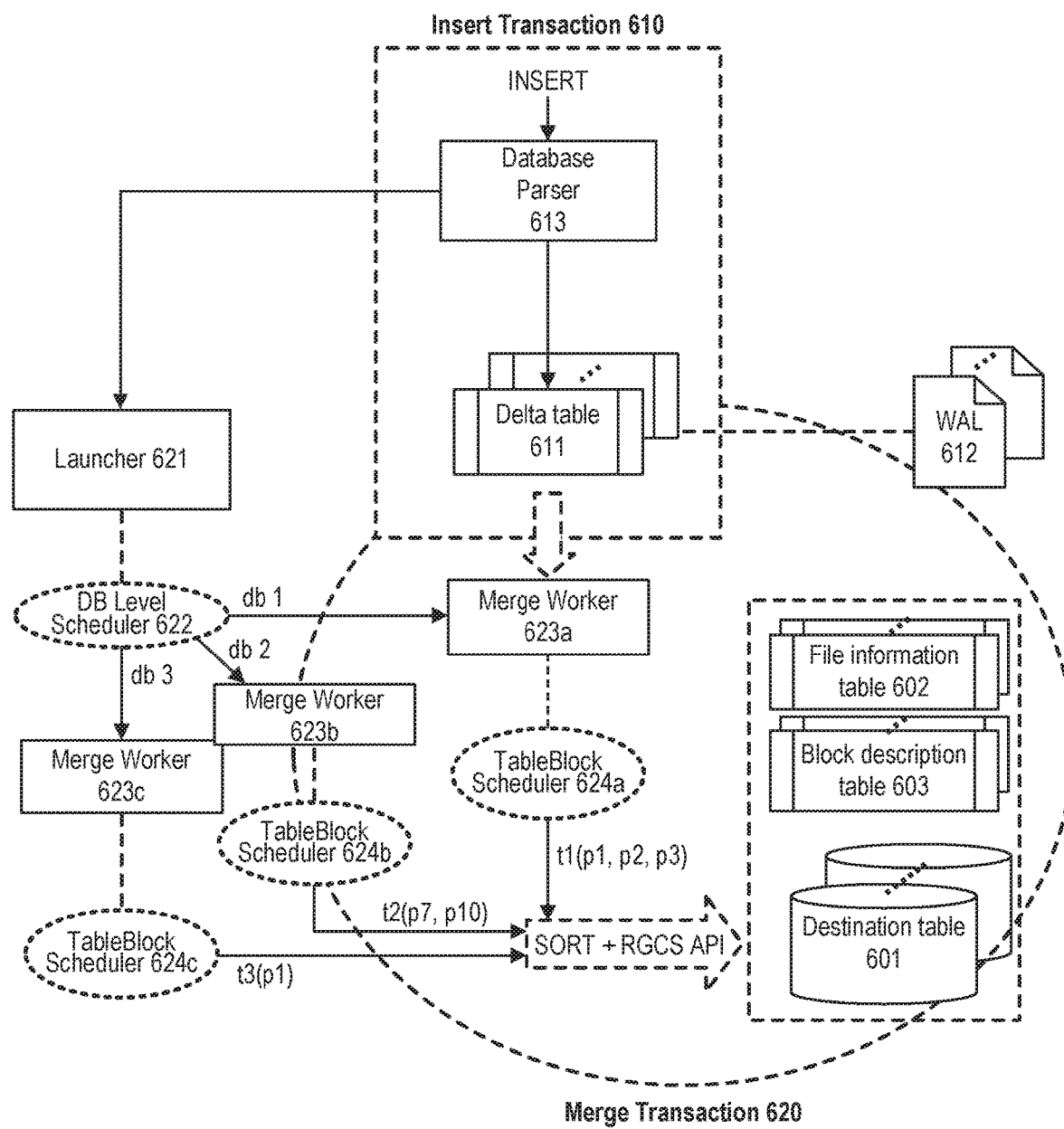
FIG. 6A illustrates a schematic diagram of an exemplary data ingestion operation, consistent with some embodiments of the present disclosure.

An exemplary database system can provide the file that contains the formatted relational database and can also provide tables that contains metadata associated with the relational database. The metadata that describes schemas of the relational database are stored separately in a block description table and a file information table. The changes of data of the database are stored in a delta table 611 as shown in FIG. 6A. All of the three tables can support ACID and are row-oriented tables. The three tables are protected by a Write Ahead Log (WAL) in the database. The WAL provides atomicity and durability properties, which are two properties of ACID. All modifications are written to the WAL before the modifications are applied. Usually both redo and undo information are stored in the WAL. When rows are inserted to a database, the rows are re-directed to the delta table. It is more efficient to store the rows in the row-oriented delta table. A certain number of the rows are accumulated in the delta table, and then are merged to the column-row hybrid format database in a batch. Since it is uncertain whether a row is in the delta table or in the column-row database, a query can be used to check both the delta table and the column-row hybrid database for data. The support of ACID of the three tables enables that transactions on data of the relational database is performed at a block level, even though the data is stored separately from the metadata.

In some embodiments, database systems can implement metadata structures to accompany data that is stored in blocks. Metadata of a data block in a row-column hybrid storage can contain important information for the data block, such as the location of the data stored in the data block in the original file. The metadata of a data block can also contain statistical information about each column in the block, such as minimum and maximum values of each column in the block. If data is compressed when the data is stored into storage, metadata can also comprise information on the compression process, such as the method of compression. In some embodiments, metadata is collected or determined when the data is written into storage. In some embodiments, metadata is stored separately from the data files. For example, the metadata can be stored in auxiliary tables in the database system.

Figure 5:
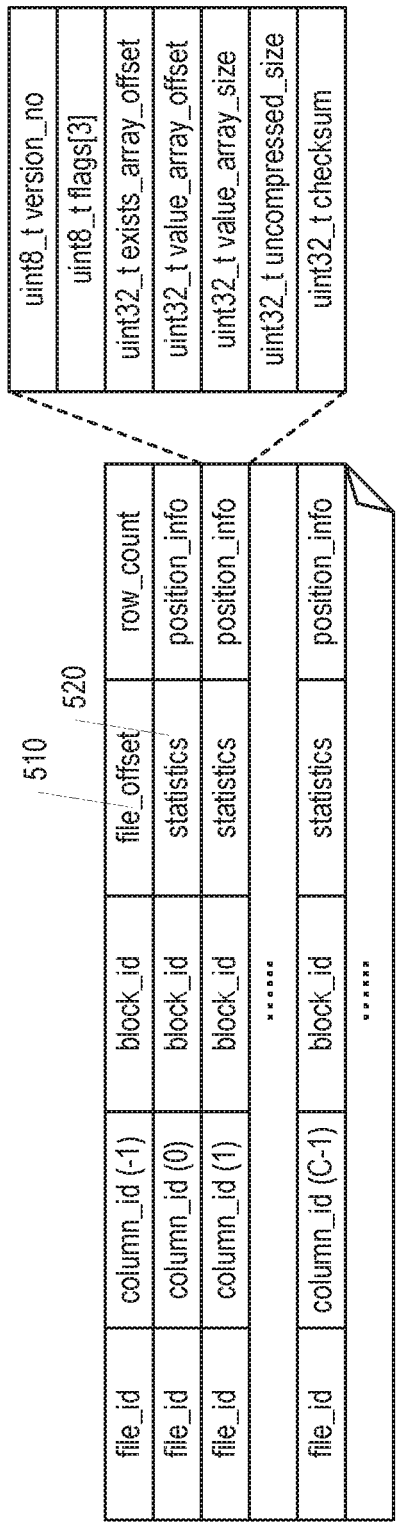
FIG. 5 illustrates a schematic diagram of an exemplary block description table, consistent with some embodiments of the present disclosure.

FIG. 5 illustrates a schematic diagram of an exemplary block description table, according to some embodiments of the present disclosure.

The block description table that describes schema of each column in the blocks of the file is provided. The block description table can include attributes such as location offsets (file_offset 510 shown in FIG. 5) of blocks in a file, a delete bitmap that indicates deleted rows in the block, and statistic information (statistics 520 shown in FIG. 5) including minimum value and maximum value of each column in the block. The statistic information of the blocks can be used to filter out the blocks before the blocks in the file are accessed. The database shown in FIG. 1 is used as an example, if a query is generated to analyze employees whose salaries are below 5000 while the minimum value of the "salary" column in block 0 is 10000, then further queries of data in block 0 can be eliminated to reduce I/O operation cost.

Table 1 below shows description of exemplary attributes contained in the block description table. For example, delete bitmap is used to support a delete operation, can indicate which rows of the relational table are to be deleted by marking the deleted rows with value −1. The values of each column in the file can be retrieved via offset information stored in position_info of each column. Any row can be located in the file by an index (e.g., index[file number, row number]) along with seg_no, start_row_no and row_count.

TABLE 1

Attribute Description of Block Description Table

| Attribute | Type | Description |
| --- | --- | --- |
| seg_no | INT4 | segment file number |
| column_no | INT4 | column number, same as pg_attribute_attnum (starting from 1), value −1 is used to mark the deleted rows in delete_bitmap |
| start_row_no | INT8 | initial row number of the block |
| file_offset | INT8 | only valid at column_no = −1 |
| row_count | INT4 | only valid when column_no = −1, number of rows in the block, including deleted rows |
| delete_count | INT4 | only valid when column_no = −1, number of deleted rows in the block |
| delete_bitmap | BYTEA | only valid when column_no = −1 |
| statistics | BYTEA | only valid when column_no > 0, statistics of a column |
| position_info | BYTEA | only valid when column_no > 0, position info of a column |

The file information table (not shown) that describes schema information of the file is provided. The file information table can include attributes such as file number (seg_no), total number of rows including deleted rows, total number of blocks and size of the file (eof). For example, attribute eof can help support multiple bulk load transactions. When multiple bulk load transactions are requested at the same time, different transactions are not allowed to write into the same file. Each transaction is assigned with a different file to write, or is assigned to a newly created one if there is no file available. The eof column not only indicates the size of the file, but also supports the ACID requirements of the transactions. When a bulk load transaction commits, the load transaction updates the eof column with a new offset such that the inserted data is visible. When a bulk load transaction aborts, the original eof still points to the offset before the load transaction happens. This can cause the inserted data to be unavailable even if the new data is already in the file.

The other exemplary attributes of the file information table are shown in Table 2 below.

TABLE 2

Attribute Description of File Information Table

| Attribute name | Type | Description |
| --- | --- | --- |
| seg_no | INT4 | file number |
| tup_count | INT8 | total number of rows in the file including deleted rows, also being used to generate row number for new rows. |
| varblock_count | INT8 | total number of blocks |
| eof | INT8 | total size of file |

If metadata is available in a database system, the database system can take advantage of the statistical information and location information of each column shown in the metadata table and further improve the efficiency of prefetching data for query execution.

Figure 6B:
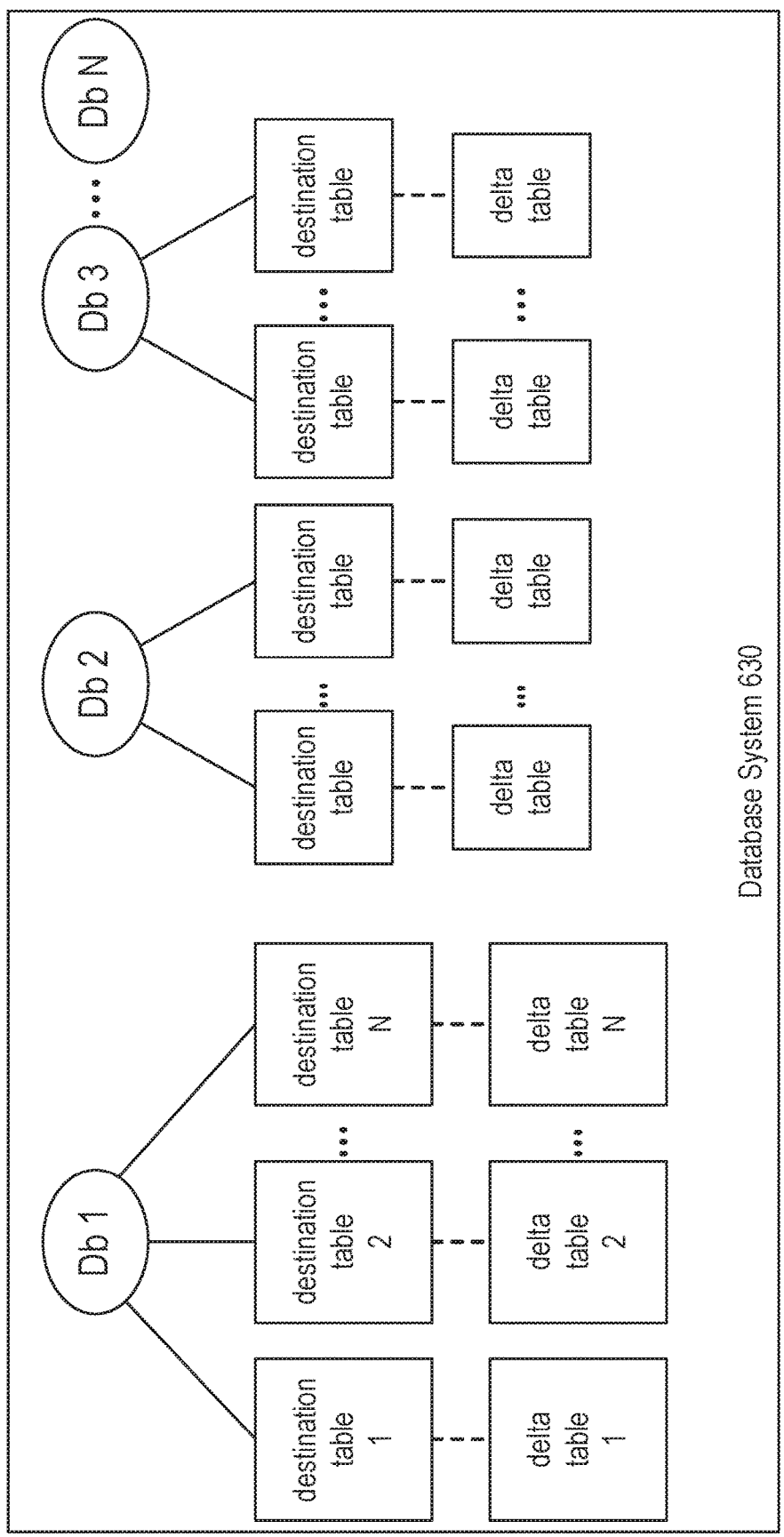
FIG. 6B illustrates a schematic diagram of an exemplary database system, consistent with some embodiments of the present disclosure.

FIG. 6A illustrates a schematic diagram of an exemplary data ingestion operation, consistent with some embodiments of the present disclosure. In an example shown in FIG. 6A, the exemplary data ingestion operation is performed in an exemplary database system (e.g., database system 630 shown in FIG. 6B). The database system can include one or more databases. For example, in an online commerce platform that employs the database system, there can be a financial department database and an online commerce department database. Each department can have one or more fact tables (e.g., destination table 1, 2, . . . and N as shown in FIG. 6B) that saves values of data. The financial department database can have a salary fact table and a cost fact table. The online commerce department database can have a payment fact table and an inventory fact table. During shopping activities, data are constantly added to the payment fact table and the inventory fact table in a large amount and queries against these two fact tables by users are performed frequently. In this example, the row-column hybrid format described in FIG. 2, FIG. 4 and FIG. 5 is used for the fact tables for efficient OLAP queries.

To make insert operations more efficient, row-oriented delta tables that save changes of data of the fact tables are provided. The row-oriented format facilitates more efficient data insertion. The delta tables buffer data that is requested to be inserted to fact tables, the buffered data is subsequently merged to the fact tables. Since multiple fact tables receive the inserted data at the same time, scheduling among subsequent merging tasks is also provided.

In this example, each fact table (e.g., destination table 601) is associated with one delta table (e.g., delta table 611) and other metadata tables (e.g., file information table 602 and block description table 603) that save information related to database structures of the fact tables and information for facilitating operations on the fact tables. Specifically, as shown in FIG. 6A, data is requested to be inserted to destination table 601, and correspondingly buffered by a delta table 611. It is appreciated that destination table 601 shown in FIG. 6A can be one of the row-column hybrid fact tables that receive data insertion, the other fact tables not shown in FIG. 6A can be involved in the exemplary data ingestion operation in the same manner. The other metadata tables associated with destination table 601 can include a file information table 602 that saves database structures of destination table 601, and a block description table 603 that saves schema information of each column in blocks of destination table 601. Delta table 611, file information table 602 and block description table 603 are row-oriented tables, are protected by using a Write Ahead Log (WAL) 612 respectively to comply with the ACID factors. For example, WAL 612 provides atomicity and durability properties of ACID to delta table 611. By using WAL 612, inserted rows are added to WAL 612 in the form of appending. Therefore, delta table 611 is used to facilitate frequent and massive insert requests on destination table 601, because efficient data insertion and ACID compliance are essential to database operations, and the row-oriented format of delta table 611 provides fast data insertion and WAL 612 of delta table 612 provides ACID compliance. The exemplary data ingestion can be separated into two transactions because ACID requirements need to be satisfied for both the step of buffering data in delta table 611 and the step of eventually saving the data in destination table 601. The exemplary data ingestion operation can include an insert transaction 610 and a merge transaction 620 as shown in FIG. 6A.

In some embodiments, a database parser 613 and delta table 611 can be involved with insert transaction 610. When a request to insert rows to destination table 601 is received, database parser 613 processes the request, breaks up components of the query of the request according to grammar rules. The rows are not directed to destination table 601 directly but are instead cached in delta table 611 associated with destination table 601. It is appreciated that in the example of the online commerce platform, destination table 601 (which is associated with delta table 611, file information table 602 and block description table 603) is an example of the fact tables of various databases (e.g., the online commerce department database and the financial department database). After insert transaction 610 is committed, insert transaction 610 is considered complete and the inserted data is buffered in delta table 611. Transaction committing indicates completion of insert transaction 610 and indicates that the inserted data is visible to subsequent queries. In some embodiments, the query can see the inserted data after a visibility check of Isolation requirements of ACID approves the transaction. Merge transaction 620 can automatically move data periodically from the delta table 611 to destination table 601 when a certain condition is satisfied (e.g., every 50000 rows inserted or every 5 blocks of data accumulated).

During an initialization phase of processing the request, a launcher 621 can be triggered to determine which database is the busiest (e.g., the online commerce department database and the financial department database), and which fact table is the busiest among all the fact tables (e.g., the payment fact table and the inventory fact table), and schedule data merging subsequently. In the example of the online commerce system, the online commerce department database can receive more data insertion operations during peak shopping periods in comparison to the financial department database, because the payment fact table and the inventory fact table of the online commerce department can receive large amounts of data insertion operations due to consumer purchase activities. Merging tasks of multiple databases are prioritized and assigned to worker processes during merge transaction 620. As shown in FIG. 6A, Merge transaction 620 can be performed by launcher 621 including a database level scheduler 622 and merge workers 623a, 623b and 623c. Launcher 621 can be a process of a computer program that is executed by one or more threads.

DB level scheduler 622 can determine when and how many worker processes are allocated on each database (e.g., the online commerce department database and the financial department database). The worker processes are essentially allocated to merge data from each delta table associated with each fact table of the databases. DB level scheduler 622 can access runtime information including statistics such as a total number of rows inserted into and deleted from each delta table of each database, a total number of full-table scans on a delta table performed by various queries. Commands and concurrent merging tasks can register activities that modify the delta tables in the runtime information when the activities are committed. The commands can include SQL Data Manipulation Language (DML) commands such as SELECT, UPDATE, INSERT and DELETE.

During merging transaction 620, two levels of schedulers are used to schedule merging. The first level is to calculate priority scores of the databases and prioritize the merging of the databases, and the second level is to calculate priority of each fact table of the databases. The scheduling is to find the most active fact tables for merging. Since data intended to be inserted to the fact table is buffered in delta table 611, determining whether the fact table is active is equivalent to determining whether the delta table associate with the fact table is active. As shown in FIG. 6A, the first level scheduler is DB level scheduler 622, the second level scheduler is table block schedulers 624a, 624b and 624c. In some embodiments, a total number of rows that have not been merged from a delta table can be determined, if the total number of the rows exceeds a threshold, a priority of the delta table can be adjusted to a higher level for merging if there is a need.

As described earlier, a database system can include various databases. A database can include one or more fact tables. Since the fact tables are in column-row hybrid format, one delta table is associated with one fact table for buffering inserted rows. To determine which database is the most active and has the most compelling need for merging buffered data, statistics of the delta tables associated with the fact tables are determined for merging scheduling. DB level scheduler 621 can assign each database a priority score based on the following formula:

$$\text{Priority}(d) = \frac{\sum_{j=0}^{n/5} (top_j)^2}{\sum_{i=0}^{n} K_i^2} \times \sum_{i=0}^{n} K_i \qquad \text{Formula (1)}$$

where database d has n delta tables, each delta table associated with a fact table of database d, in the ith delta table, K is a total number of rows that have not been merged, the value of $K_i$ being a number of inserted rows minus a number of deleted rows. K indicates a net increase of data in the ith delta table. The impact of the net increase on the priority score is emphasized by applying a square on $K_i$. A merge job can delete the rows that have been merged before the merge job is committed. The $(top_j)$ is a total number of rows that have not been merged in the jth delta table when multiple delta tables are sorted in a descending order based on $K_i$. By applying formula (1), the following rules are applied to a database: First, as the total number of rows (e.g., represented by $\Sigma_{i=0}^{n} K_i$) increases, the higher the priority score of the database is. Second, as a value that the data growth from the top 20% delta table accounts for the total data growth of all delta tables of the database increases, the higher the priority score is. $\Sigma_{j=0}^{n/5}(top_j)^2$ indicates data net increase of the top 20% delta tables. In the above-mentioned online commerce platform, for example, the online commerce department database has 20 fact tables (including the payment fact table and the inventory fact table) and accordingly 20 delta tables. The net increase of data of the top 4 delta tables (number 4 is determined by n/5) are considered along with the net increase of data of all 20 fact tables. The top 4 delta tables include the delta tables of the payment fact table and the inventory fact table. During peak shopping hours, the payment fact table and the inventory fact table receive a large amount of data insert requests and therefore buffer a large amount of data in the corresponding delta tables. In comparison, the financial department database has 10 total fact tables, the number of rows to be inserted is fewer and the data increase is relatively evenly distributed among all fact tables since purchasing events trigger significant data increase in the online commerce department database, not in the financial department database. Therefore, how much data increase is generated on a database and whether the data increase is concentrated on the top fact tables are used to determine which database to merge first such that resources are used where it is most needed. The database system is configured to prioritize merging the databases that have more active delta tables.

In some embodiments, the priority score of formula (1) can be adjusted. For example, when by default the threshold of merging a delta table is 500,000 rows, a total number of current rows inserted and cached in the delta table (e.g., $K_j$) is 50,000 rows, a ratio between the current rows in the delta table to the threshold of merging by default is 10%. The priority score can be boosted using the ratio 10% and adjusted to be a priority score (Priority (d)*(1+10%)). The priority score adjustment is based on real-time data, therefore the merging transactions of the databases that have more rows to be merged in real time are given more weights. It is to ensure that resources are used on the most quickly increasing databases. The databases with higher priority scores are ranked higher in a work item list.

In some embodiments, launcher 621 can run in a loop with iterations. At each iteration, launcher 621 can launch a new merge worker process and assign a database on the top of the work item list to the worker. The worker can then start working on the assigned database. Launcher 621 can run multiple worker processes concurrently (e.g., workers 623a, 623b, 623c). When the number of the concurrently running worker processes exceeds a concurrent process threshold, a hold is placed, and launcher 621 can enter into a sleep mode. The concurrent process threshold can be a configurable variable, for example, 10. Launcher 621 can be woken up when a worker has completed one of the concurrent running processes. Launcher 621 can determine if it is necessary to assign the worker to the top-ranked database on the work item list based on the number of the rows to be merged of the top-ranked database, since the worker that just completed one process becomes available and multiple workers can be assigned to one database. In addition, launcher 621 can also be woken up due to a timeout from the sleep mode.

In some embodiments, when a database is assigned to a worker, DB level scheduler 622 can estimate a total number of rows to be merged and can adjust the ranking of the database in the work item list based on the estimation. When a worker completes a merge job for a database, the worker updates the runtime information with the worker's activities on the database. The worker then indicates to launcher 621 that the priority score of the database can be adjusted and the database can be re-ranked in the work item list. As shown in FIG. 6A, databases db 1, db 2 and db 3 are assigned with merge worker 623a, 623b and 623c respectively. db 1, db 2 and db 3 can be the top 3 databases on the work item list based on corresponding priority scores. When merge worker 623a completes merging for db 1, DB level scheduler 622 can determine whether to assign merge worker 623a on db 2 or on another database on the top position on the work item list.

In some embodiments, the worker can be assigned a maximum I/O quota, which is a configurable variable. The quota can be adjusted by the database system when the worker accumulates more runtime information about how busy the database system is. For example, when the quota is 100, the worker can merge at most 100 pages for one or more delta tables at each round. The quota is provided to prevent the worker from placing holds on data (e.g., record locks that previous simultaneous access to data) for too long.

The second level scheduling is used to prioritize merging of respective delta tables. The second level scheduling is done by a block scheduler (e.g., TableBlock Schedulers 624a, 624b and 624c as shown in FIG. 6A). The block scheduler determines how much share of a total I/O quota is allowed for the worker that each delta table can obtain. The runtime information used by the block scheduler includes a total number of full-table scans performed by various queries on each delta table. In some embodiments, the delta table is kept as small as possible if the delta table is fully scanned by many queries because the row-oriented format adopted by the delta table is not as efficient for a full table scan. Computing the share of I/O quota for a delta table can be determined based on the following formula:

$$\text{share}(t_j) = \frac{K_j^2 \times w_j}{\sum_{i=0}^{n}(K_i^2 \times w_i)} \times MaxQuota \qquad \text{Formula (2)}$$

where $w_j$ is a total number of full-table scan queries on a jth delta table in a time window, e.g., 30 seconds, MaxQuota is the maximum I/O quota. By applying formula (2), multiple delta tables can be selected for merging and each selected delta table obtains a share of the quota. The delta table that has the share equal to 0 is left unchanged at the current round of merging.

In some embodiments, the worker merges the selected delta tables one by one. For each delta table, relevant actions are wrapped in one new transaction, therefore the actions can be all-done or non-done to ensure ACID compliance.

Merge transaction 620 as shown in FIG. 6A can be performed as follows. A snapshot of merge transaction 620 can be obtained at the beginning of merge transaction 620 and the snapshot can be used throughout the entire merge transaction of a delta table. Taking the snapshot of merge transaction 620 can involve taking snapshot of delta table 611, file information table 602 and block description table 603. During merging, taking a snapshot provides concurrency control to allow concurrent data access and data manipulation and avoids viewing inconsistent data caused by concurrent transactions performing updates on the same rows. In the example, delta table 611, file information table 602, and block description table 603 support Multi-Versioned Concurrency Control (MVCC). When MVCC is utilized, instead of locking rows, the database system creates the snapshot of data and the snapshot can be supplied to any other concurrent transactions. The snapshot indicates a time-stamped version of the data. Multiple snapshots can be taken for transactions occurring at different time instances. The multiple snapshots can indicate multiple versions of the data along a timeline with different time stamps. The inserted rows can be read from delta table 611 and can be sorted for obtaining statistics of the inserted rows. The statistics can be used to filter blocks that do not save desired data for fast data retrieving. The values of the sorted rows can be written by column to the files of destination table 601. Accordingly, the database system can update file information table 602 and block description table 603. Since delta table 611, file information table 602, and block description table 603 also support WAL. Added data is stored in WAL as part of the snapshot. When the database system ends merge transaction 620 with a commit, the merged rows can be viewed in destination table 601, and are no longer in delta table 611 from the perspective of any concurrent query with a snapshot having a time stamp later than the time stamp of the snapshot of committed merge transaction 620. The commit also assures that block description table 603 is added with one new row, which indicates that a new block is ready for access. The new row in block description table 603 contains system information about where the new block is in the files of destination table 601. If merge transaction 620 is aborted due to any issue, all delete operations to the delta tables are rolled back. Before the rollback, in some embodiments, some blocks can be added to one or more files of destination table 601. But since the insertion to block description table 603 can be also rolled back, new rows associated with the added blocks are not added in block description table 603 after the rollback. Updated file information table 602 can also be rolled back in the same manner. Therefore, merge transaction 620 is ACID compliant.

Figure 7:
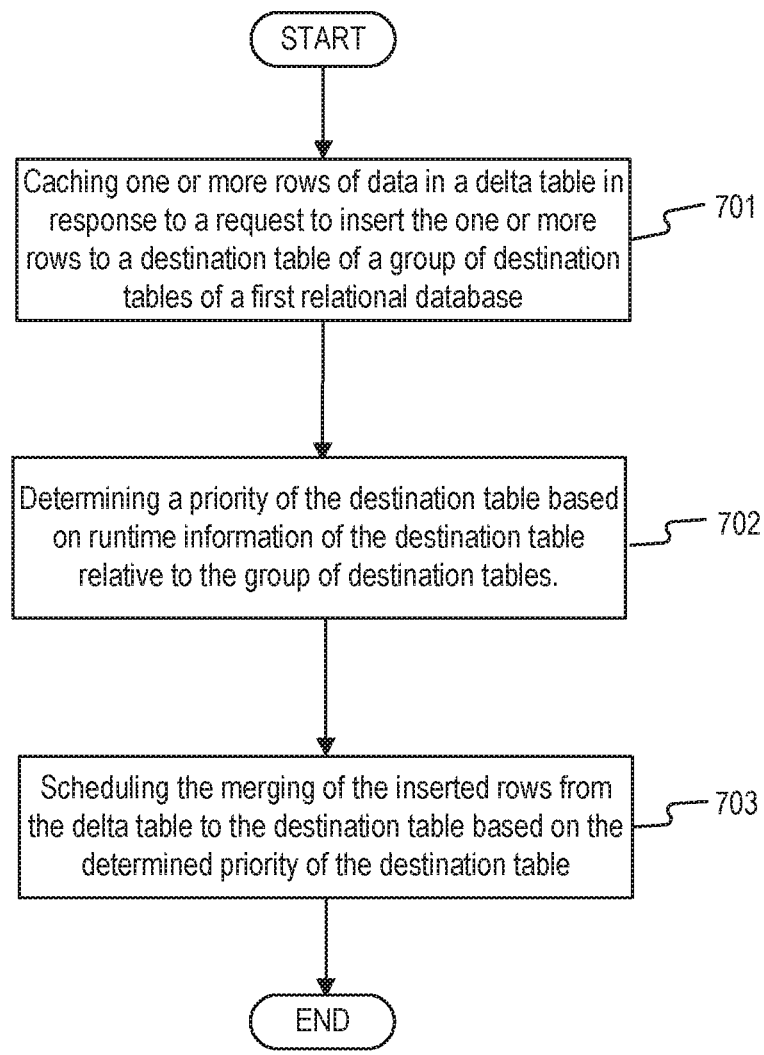
FIG. 7 illustrates a flowchart of an exemplary method for inserting data in relational databases, consistent with some embodiments of the present disclosure.

Embodiments of the present disclosure provide a method for inserting data in relational databases. FIG. 7 illustrates a flowchart of an exemplary method for inserting data in relational databases, consistent with some embodiments of the present disclosure. It is appreciated that method 700 of FIG. 7 can be performed by a database system (e.g., database system 100 of FIG. 3) or a server (e.g., server 110 of FIG. 3). The method can include the following steps.

In step 701, a database system receives a request to insert one or more rows of data to a fact table (e.g., destination table 601) caches the rows in a delta table (e.g., delta table 611 of FIG. 6A). Destination table 601 is in a format of a file storing one or more blocks, each block having a set of sequence of elements clustered from each column of destination table 601, the set of sequence of elements of each column has a same number of elements, as described in FIG. 2, FIG. 4, and FIG. 5. The delta table is used to store changes of the elements of the destination table 601. The changes are caused by a data operation. As shown in FIG. 6A, insert transaction 610 and merge transaction 620 are involved to perform data ingestion. Delta table 611 is a row-oriented table where transactions such as insert are efficient. The rows that are requested to be inserted to the destination table 601 are re-directed to delta table 611 for future merging. The inserted rows are accumulated in delta table 611 and are later merged to destination table 601 under certain conditions.

In step 702, the database system determines a priority of destination table 601 based on runtime information of destination table 601, relative to the group of destination tables. Destination table 601 can be one of a group of destination tables of the first relational database.

In some embodiments, the runtime information can include statistics such as a total number of rows inserted into and deleted from each delta table of each destination table, a total number of full-table scans on the delta table performed by various queries. Commands and concurrent merging tasks can register activities that modify the delta tables in the runtime information when the activities are committed. The commands can include SQL Data Manipulation Language (DML) commands such as SELECT, UPDATE, INSERT and DELETE. In some embodiments, the priority of destination table 601 can be determined based on a combination of runtime information and static information.

In some embodiments, the database system (e.g., database system 630 of FIG. 6B) can include a plurality of relational databases. The first relational database can be one of the relational databases 1, 2, ..., and N as shown in FIG. 6B. Each relational database can include a one or more destination tables, each of which can be associated with one delta table for buffering the inserted rows.

In some embodiments, the database system determines a database priority of each database based on formula (1) above. By applying formula (1), the following rules are applied to a database: First, as the total number of rows (e.g., represented by $\Sigma_{i=0}^{n}K_i$) increases, the higher the priority score of the database is. Second, as a value that the data growth from the top 20% delta table accounts for the total data growth of all delta tables of the database increases, the higher the priority score is. How much data increase is generated on a database and whether the data increase is concentrated on the top fact tables are used to determine which database to merge first such that resources are used where it is most needed. The database system is configured to prioritize merging the databases that have more active delta tables.

In some embodiments, the priority score of formula (1) can be adjusted based on a total number of the rows in the delta table and a threshold of data accumulation of the delta table. For example, when by default the threshold to merge data from the delta table is 500,000 rows, a total number of current rows inserted and cached in the delta table (e.g., $K_i$) is 50,000 rows, a ratio between the current rows in the delta table to the threshold of merging by default is 10%. The priority score can be boosted using the ratio 10% and adjusted to be a priority score (Priority (d)*(1+10%)). The priority score adjustment is based on real-time data, therefore the merging transactions of the databases that have more rows to be merged in real time are given more weights. It is to ensure that resources are used on the most quickly increasing databases. The databases with higher priority scores are ranked higher in a work item list.

In some embodiments, if the priority of the database satisfies the condition, the database system schedules one or more work processes on the database. The database system can launch a new work process and can assign a database on the top of the work item list to the worker. If the database has the highest priority score, the database is placed on the top of the work list item, then the database system schedules the work processes on the database. The worker can then start working on the assigned database. In addition, multiple work processes can be assigned to one database. The database system can launch work processes through iterations. At each iteration, the database system can launch one work process. The database system can also place a hold on work process launching when the number of the concurrently running work processes (e.g., workers 623a, 623b, 623c) exceeds a concurrent process threshold. The concurrent process threshold can be a configurable variable, for example, 10. When one of the concurrent worker processes has been completed, the database system can determine if the worker for the completed process can be assigned to the top-ranked database.

In some embodiments, the worker can be assigned a maximum I/O quota which is a configurable variable. The quota can be adjusted by the database system when the worker accumulates more runtime information about how busy the database system is. For example, when the quota is 100, the worker can merge at most 100 pages for one or more delta tables at each round. The quota is provided to prevent the worker from placing hold on data (e.g., record locks that previous simultaneous access to data) for too long. The worker can include one or more block schedulers. The block scheduler determines how much share of total I/O quota allowed for the worker that each delta table can obtain. The runtime information used by the block scheduler includes a total number of full-table scans done by various queries on each delta table. The delta table is kept as smaller as possible if the delta table is fully scanned by many queries because the row-oriented format adopted by the delta table is not efficient for full table scan. Computing the share of I/O quota for a table can be based on formula (2) described above.

By applying formula (2), multiple delta tables can be selected for merging and each delta table obtains a share of the quota. The delta table that has the share equal to 0 is left unchanged at the current round of merging.

Figure 8:
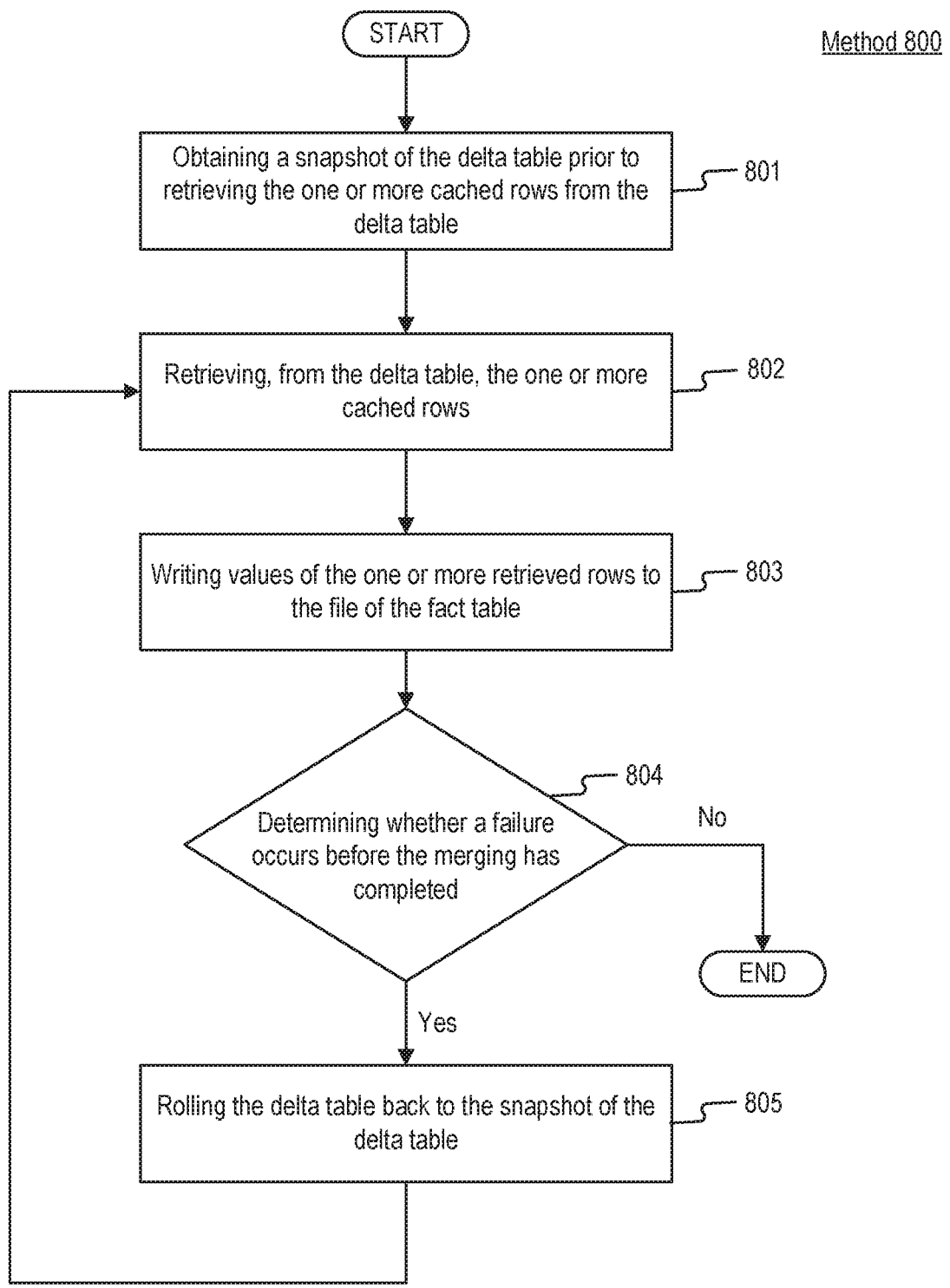
FIG. 8 illustrates a flowchart of an exemplary method for merging data in relational databases, consistent with some embodiments of the present disclosure.

In step 703, the database system schedules the merging of the inserted rows from delta table 611 to the destination table 601 based on the determined priority of the destination table. After the database system determines the share of I/O that the work process can use to merge the inserted rows from delta table 611 to destination table 601, and determines that the share of I/O of delta table 611 is not zero, the database system merges the inserted rows from delta table 611 to destination table 601. Step 703 is further illustrated as method 800 as shown in FIG. 8. Step 703 can include steps 801-805.

Embodiments of the present disclosure provide a method for merging data in a relational database. FIG. 8 illustrates a flowchart of an exemplary method for merging data in a relational database, consistent with some embodiments of the present disclosure. It is appreciated that method 800 of FIG. 8 can be performed by a database system (e.g., database system 100 of FIG. 3) or a server (e.g., server 110 of FIG. 3). The method can include the following steps.

In step 801, a database system obtains a snapshot of the merge transaction. Taking the snapshot of the merge transaction can include taking snapshot of a delta table. The snapshot allows rollback of the deleted rows to the delta table in response to a failure of a complete transaction. The snapshot is obtained at the beginning of the merge transaction, and the snapshot can be used throughout the entire merge transaction of a table.

In step 802, the database system then retrieves one or more cached rows from the delta table.

In step 803, the database system writes values of the retrieved rows to a file of the destination table (e.g., destination table 601 of FIG. 6A). The file is in a row-column hybrid format of the database.

In step 804, the database system determines whether a failure of a complete transaction occurs. If a failure of the complete transaction occurs, the method proceeds to step 805. If a failure of the complete transaction does not occur, the method ends. When the database system ends the merge transaction with a commit, the merged rows can be viewed in destination table 601 as shown in FIG. 6A, and are no longer in delta table 611 from the perspective of any concurrent query with a snapshot having a time stamp later than the time stamp of the snapshot of the committed merge transaction. The commit assures that the block description table is added with one new row, which indicates that a new block is ready for access. The new row in the block description table contains system information about where the new block is in the files of destination table 601.

In step 805, in the situation where there is a failure determined in step 804, the database system rolls the delta table back to the snapshot of the delta table. If the merge transaction (e.g., merge transaction 620 as shown in FIG. 6A) is aborted due to any issue, all delete operations to the delta tables are rolled back. Before the rollback, in some cases some blocks have been added to one or more files of the row-column hybrid table. But since the insertion to the block description table is also rolled back, new rows associated with the added blocks are not added in the block description table after the rollback. Therefore, the merge transaction is ACID compliant.

It is appreciated that the above described embodiments can be implemented by hardware, or software (program codes), or a combination of hardware and software. If implemented by software, it may be stored in the above-described computer-readable media. The software, when executed by the processor can perform the disclosed methods. The computing units and other functional units described in this disclosure can be implemented by hardware, or software, or a combination of hardware and software. It is understood that multiple ones of the above described modules/units may be combined as one module/unit, and each of the above described modules/units may be further divided into a plurality of sub-modules/sub-units.

Unless specifically stated otherwise, the term "or" encompasses all possible combinations, except where infeasible. For example, if it is stated that a component may include A or B, then, unless specifically stated otherwise or infeasible, the component may include A, or B, or A and B. As a second example, if it is stated that a component may include A, B, or C, then, unless specifically stated otherwise or infeasible, the component may include A, or B, or C, or A and B, or A and C, or B and C, or A and B and C.

The embodiments may further be described using the following clauses:

1. A method for inserting data in a database, comprising:
   storing one or more rows of data in a delta table in response to a request to insert the one or more rows in a destination table, wherein the destination table is one of a group of destination tables of a first database, and wherein the delta table contains requested changes of rows of the destination table, the changes being caused by a data operation;
   determining a priority of the destination table based on runtime information of the destination table relative to the group of destination tables; and
   scheduling the merging of the inserted rows from the delta table to the destination table based on the determined priority of the destination table;
   wherein the destination table is in a format of a file storing one or more blocks, each block having a set of sequence of elements clustered from each column of the destination table.

2. The method of clause 1, wherein scheduling the merging of the inserted rows from the delta table to the destination table based on the determined priority of the destination table comprises:
   obtaining a snapshot of the delta table prior to retrieving the one or more cached rows from the delta table;
   retrieving, from the delta table, the one or more cached rows;
   writing values from the retrieved rows to the destination table; and
   deleting the written rows from the delta table;
   wherein the snapshot enables rollback of the deleted rows to the delta table in response to a failure occurring before the merging has completed.

3. The method of clause 2, wherein obtaining the snapshot of the delta table prior to retrieving the one or more cached rows from the delta table further comprises:
obtaining the snapshot of a file information table and a block description table, wherein the file information table and the block description table are associated with the destination table.
4. The method of any one of clauses 1-3, wherein determining the priority of the destination table based on runtime information of the destination table relative to the group of destination tables comprises:
assigning a work process to the first database for merging the cached one or more rows of the delta table to the destination table of the first database.
5. The method of clause 4, wherein the group of destination tables correspond to a group of delta tables, each delta table of the group of delta tables having a corresponding destination table of the group of destination tables and wherein the work process to the first database enables merging the group of delta tables to the group of destination tables.
6. The method of clause 5, further comprising
determining an input/output (I/O) quota that the work process uses for merging rows of group of delta tables to the group of destination tables of the first database.
7. The method of clause 6, further comprising:
determining a share of the determined I/O quota that the work process uses for merging the one or more rows from the delta table to the destination table; and
selecting, for merging, the delta table of among the group of delta tables of the first database based on the determined share of I/O quota satisfying a quota condition.
8. The method of any one of clauses 1-7, wherein the database system includes a plurality of databases, the first database is one of the plurality of databases.
9. The method of clause 8, further comprising:
determining a database priority of each database of the plurality of databases based on runtime information of the plurality of destination tables of each database; and
selecting, for merging, a set of one or more databases of the plurality of databases based on the determined database priority satisfying a database priority condition.
10. The method of clause 9, wherein determining a priority of the destination table based on runtime information of the destination table relative to the group of destination tables further comprises:
adjusting the database priority score of the database based on a total number of the rows in the group of delta tables of the first database and a threshold of data accumulation in the group of delta tables of the first database.
11. The method of any one of clauses 1-10, wherein the runtime information comprises at least one of:
a total number of rows inserted to the delta table, a total number of rows deleted from the delta table, or a number of full-table scans on the delta table.
12. The method of any one of clauses 1-11, wherein determining the priority of the destination table based on runtime information of the destination table relative to the group of destination tables comprises:
determining the priority of the destination table based on both of runtime information and static information of the destination table relative to the group of destination tables.

13. A non-transitory computer readable medium that stores a set of instructions that is executable by at least one processor of a computer to cause the computer to perform a method for inserting data in a database, the method comprising:
storing one or more rows of data in a delta table in response to a request to insert the one or more rows in a destination table, wherein the destination table is one of a group of destination tables of a first database, and wherein the delta table contains requested changes of rows of the destination table, the changes being caused by a data operation;
determining a priority of the destination table based on runtime information of the destination table relative to the group of destination tables; and
scheduling the merging of the inserted rows from the delta table to the destination table based on the determined priority of the destination table;
wherein the destination table is in a format of a file storing one or more blocks, each block having a set of sequence of elements clustered from each column of the destination table.
14. The computer readable medium of clause 13, wherein scheduling the merging of the inserted rows from the delta table to the destination table based on the determined priority of the destination table comprises:
obtaining a snapshot of the delta table prior to retrieving the one or more cached rows from the delta table;
retrieving, from the delta table, the one or more cached rows;
writing values from the retrieved rows to the destination table; and
deleting the written rows from the delta table;
wherein the snapshot enables rollback of the deleted rows to the delta table in response to a failure occurring before the merging has completed.
15. The computer readable medium of clause 14, wherein obtaining the snapshot of the delta table prior to retrieving the one or more cached rows from the delta table further comprises:
obtaining the snapshot of a file information table and a block description table, wherein the file information table and the block description table are associated with the destination table.
16. The computer readable medium of any one of clauses 13-15, wherein determining the priority of the destination table based on runtime information of the destination table relative to the group of destination tables comprises:
assigning a work process to the first database for merging the cached one or more rows of the delta table to the destination table of the first database.
17. The computer readable medium of clause 16, wherein the group of destination tables correspond to a group of delta tables, each delta table of the group of delta tables having a corresponding destination table of the group of destination tables and wherein the work process to the first database enables merging the group of delta tables to the group of destination tables.
18. The computer readable medium of clause 17, wherein the set of instructions that is executable by one or more processors of the computer to cause the computer to further perform:
determining an input/output (I/O) quota that the work process uses for merging rows of group of delta tables to the group of destination tables of the first database.

19. The computer readable medium of clause 18, wherein the set of instructions that is executable by one or more processors of the computer to cause the computer to further perform:
determining a share of the determined I/O quota that the work process uses for merging the one or more rows from the delta table to the destination table; and
selecting, for merging, the delta table of among the group of delta tables of the first database based on the determined share of I/O quota satisfying a quota condition.

20. The computer readable medium of any one of clauses 13-19, wherein the database system includes a plurality of databases, the first database is one of the plurality of databases.

21. The computer readable medium of clause 20, wherein the set of instructions that is executable by one or more processors of the computer to cause the computer to further perform:
determining a database priority of each database of the plurality of databases based on runtime information of the plurality of destination tables of each database; and
selecting, for merging, a set of one or more databases of the plurality of databases based on the determined database priority satisfying a database priority condition.

22. The computer readable medium of clause 21, wherein determining a priority of the destination table based on runtime information of the destination table relative to the group of destination tables further comprises:
adjusting the database priority score of the database based on a total number of the rows in the group of delta tables of the first database and a threshold of data accumulation in the group of delta tables of the first database.

23. The computer readable medium of any one of clauses 13-22, wherein the runtime information comprises at least one of:
a total number of rows inserted to the delta table, a total number of rows deleted from the delta table, or a number of full-table scans on the delta table.

24. The computer readable medium of any one of clauses 13-23, wherein determining the priority of the destination table based on runtime information of the destination table relative to the group of destination tables comprises:
determining the priority of the destination table based on both of runtime information and static information of the destination table relative to the group of destination tables.

25. A database system for inserting data in a database, comprising:
a memory storing a set of instructions; and
a processor configured to execute the set of instructions to cause the database system to perform:
storing one or more rows of data in a delta table in response to a request to insert the one or more rows in a destination table, wherein the destination table is one of a group of destination tables of a first database, and wherein the delta table contains requested changes of rows of the destination table, the changes being caused by a data operation,
determining a priority of the destination table based on runtime information of the destination table relative to the group of destination tables, and
scheduling the merging of the inserted rows from the delta table to the destination table based on the determined priority of the destination table,
wherein the destination table is in a format of a file storing one or more blocks, each block having a set of sequence of elements clustered from each column of the destination table.

26. The database system of clause 25, wherein scheduling the merging of the inserted rows from the delta table to the destination table based on the determined priority of the destination table comprises:
obtaining a snapshot of the delta table prior to retrieving the one or more cached rows from the delta table;
retrieving, from the delta table, the one or more cached rows;
writing values from the retrieved rows to the destination table; and
deleting the written rows from the delta table;
wherein the snapshot enables rollback of the deleted rows to the delta table in response to a failure occurring before the merging has completed.

27. The database system of clause 26, wherein obtaining the snapshot of the delta table prior to retrieving the one or more cached rows from the delta table further comprises:
obtaining the snapshot of a file information table and a block description table, wherein the file information table and the block description table are associated with the destination table.

28. The database system of any one of clauses 25-27, wherein determining the priority of the destination table based on runtime information of the destination table relative to the group of destination tables comprises:
assigning a work process to the first database for merging the cached one or more rows of the delta table to the destination table of the first database.

29. The database system of clause 28, wherein the group of destination tables correspond to a group of delta tables, each delta table of the group of delta tables having a corresponding destination table of the group of destination tables and wherein the work process to the first database enables merging the group of delta tables to the group of destination tables.

30. The database system of clause 28, wherein the set of instructions that is executable by one or more processors of the computer to cause the computer to further perform:
determining an input/output (I/O) quota that the work process uses for merging rows of group of delta tables to the group of destination tables of the first database.

31. The database system of clause 30, wherein the set of instructions that is executable by one or more processors of the database system to cause the database system to further perform:
determining a share of the determined I/O quota that the work process uses for merging the one or more rows from the delta table to the destination table; and
selecting, for merging, the delta table of among the group of delta tables of the first database based on the determined share of I/O quota satisfying a quota condition.

32. The database system of any one of clauses 25-31, wherein the database system includes a plurality of databases, the first database is one of the plurality of databases.

33. The database system of clause 32, wherein the set of instructions that is executable by one or more processors of the database system to cause the database system to further perform:
determining a database priority of each database of the plurality of databases based on runtime information of the plurality of destination tables of each database; and
selecting, for merging, a set of one or more databases of the plurality of databases based on the determined database priority satisfying a database priority condition.

34. The database system of clause 33, wherein determining a priority of the destination table based on runtime information of the destination table relative to the group of destination tables further comprises:
adjusting the database priority score of the database based on a total number of the rows in the group of delta tables of the first database and a threshold of data accumulation in the group of delta tables of the first database.

35. The database system of any one of clauses 25-34, wherein the runtime information comprises at least one of:
a total number of rows inserted to the delta table, a total number of rows deleted from the delta table, or a number of full-table scans on the delta table.

36. The database system of any one of clauses 25-35, wherein determining the priority of the destination table based on runtime information of the destination table relative to the group of destination tables comprises:
determining the priority of the destination table based on both of runtime information and static information of the destination table relative to the group of destination tables.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method. In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims.

What is claimed is:

1. A method for inserting data in a database, comprising:
storing one or more rows of data in a delta table in response to a request to insert the one or more rows in a destination table, wherein the destination table is one of a group of destination tables of a first database, and wherein the delta table contains requested changes of rows of the destination table, the changes being caused by a data operation;
determining a priority of the destination table based on runtime information of the destination table relative to the group of destination tables; and
scheduling the merging of the inserted rows from the delta table to the destination table based on the determined priority of the destination table;
wherein the destination table is in a format of a file storing one or more blocks, each block having a set of sequence of elements clustered from each column of the destination table.

2. The method of claim 1, wherein scheduling the merging of the inserted rows from the delta table to the destination table based on the determined priority of the destination table comprises:
obtaining a snapshot of the delta table prior to retrieving the one or more cached rows from the delta table;
retrieving, from the delta table, the one or more cached rows;
writing values from the retrieved rows to the destination table; and
deleting the written rows from the delta table;
wherein the snapshot enables rollback of the deleted rows to the delta table in response to a failure occurring before the merging has completed.

3. The method of claim 2, wherein obtaining the snapshot of the delta table prior to retrieving the one or more cached rows from the delta table further comprises:
obtaining the snapshot of a file information table and a block description table, wherein the file information table and the block description table are associated with the destination table.

4. The method of claim 1, wherein determining the priority of the destination table based on runtime information of the destination table relative to the group of destination tables comprises:
assigning a work process to the first database for merging the cached one or more rows of the delta table to the destination table of the first database.

5. The method of claim 4, wherein the group of destination tables correspond to a group of delta tables, each delta table of the group of delta tables having a corresponding destination table of the group of destination tables and wherein the work process to the first database enables merging the group of delta tables to the group of destination tables.

6. The method of claim 5, further comprising
determining an input/output (I/O) quota that the work process uses for merging rows of group of delta tables to the group of destination tables of the first database.

7. The method of claim 6, further comprising:
determining a share of the determined I/O quota that the work process uses for merging the one or more rows from the delta table to the destination table; and
selecting, for merging, the delta table of among the group of delta tables of the first database based on the determined share of I/O quota satisfying a quota condition.

8. The method of claim 1, wherein the database system includes a plurality of databases, the first database is one of the plurality of databases.

9. The method of claim 8, further comprising:
determining a database priority of each database of the plurality of databases based on runtime information of the plurality of destination tables of each database; and selecting, for merging, a set of one or more databases of the plurality of databases based on the determined database priority satisfying a database priority condition.

10. The method of claim 9, wherein determining a priority of the destination table based on runtime information of the destination table relative to the group of destination tables further comprises:
adjusting the database priority score of the database based on a total number of the rows in the group of delta tables of the first database and a threshold of data accumulation in the group of delta tables of the first database.

11. The method of claim 1, wherein the runtime information comprises at least one of:
a total number of rows inserted to the delta table, a total number of rows deleted from the delta table, or a number of full-table scans on the delta table.

12. The method of claim 1, wherein determining the priority of the destination table based on runtime information of the destination table relative to the group of destination tables comprises:
determining the priority of the destination table based on both of runtime information and static information of the destination table relative to the group of destination tables.

13. A non-transitory computer readable medium that stores a set of instructions that is executable by at least one processor of a computer to cause the computer to perform a method for inserting data in a database, the method comprising:
storing one or more rows of data in a delta table in response to a request to insert the one or more rows in a destination table, wherein the destination table is one of a group of destination tables of a first database, and wherein the delta table contains requested changes of rows of the destination table, the changes being caused by a data operation;
determining a priority of the destination table based on runtime information of the destination table relative to the group of destination tables; and
scheduling the merging of the inserted rows from the delta table to the destination table based on the determined priority of the destination table;
wherein the destination table is in a format of a file storing one or more blocks, each block having a set of sequence of elements clustered from each column of the destination table.

14. The computer readable medium of claim 13, wherein scheduling the merging of the inserted rows from the delta table to the destination table based on the determined priority of the destination table comprises:
obtaining a snapshot of the delta table prior to retrieving the one or more cached rows from the delta table;
retrieving, from the delta table, the one or more cached rows;
writing values from the retrieved rows to the destination table; and
deleting the written rows from the delta table;
wherein the snapshot enables rollback of the deleted rows to the delta table in response to a failure occurring before the merging has completed.

15. The computer readable medium of claim 14, wherein obtaining the snapshot of the delta table prior to retrieving the one or more cached rows from the delta table further comprises:
obtaining the snapshot of a file information table and a block description table, wherein the file information table and the block description table are associated with the destination table.

16. The computer readable medium of claim 13, wherein determining the priority of the destination table based on runtime information of the destination table relative to the group of destination tables comprises:
assigning a work process to the first database for merging the cached one or more rows of the delta table to the destination table of the first database.

17. The computer readable medium of claim 16, wherein the group of destination tables correspond to a group of delta tables, each delta table of the group of delta tables having a corresponding destination table of the group of destination tables and wherein the work process to the first database enables merging the group of delta tables to the group of destination tables.

18. The computer readable medium of claim 17, wherein the set of instructions that is executable by one or more processors of the computer to cause the computer to further perform:
determining an input/output (I/O) quota that the work process uses for merging rows of group of delta tables to the group of destination tables of the first database.

19. The computer readable medium of claim 18, wherein the set of instructions that is executable by one or more processors of the computer to cause the computer to further perform:
determining a share of the determined I/O quota that the work process uses for merging the one or more rows from the delta table to the destination table; and
selecting, for merging, the delta table of among the group of delta tables of the first database based on the determined share of I/O quota satisfying a quota condition.

20. A database system for inserting data in a database, comprising:
a memory storing a set of instructions; and
a processor configured to execute the set of instructions to cause the database system to perform:
storing one or more rows of data in a delta table in response to a request to insert the one or more rows in a destination table, wherein the destination table is one of a group of destination tables of a first database, and wherein the delta table contains requested changes of rows of the destination table, the changes being caused by a data operation,
determining a priority of the destination table based on runtime information of the destination table relative to the group of destination tables, and
scheduling the merging of the inserted rows from the delta table to the destination table based on the determined priority of the destination table,
wherein the destination table is in a format of a file storing one or more blocks, each block having a set of sequence of elements clustered from each column of the destination table.

* * * * *